United States Patent [19]
Shaffer et al.

[11] Patent Number: 6,092,114
[45] Date of Patent: Jul. 18, 2000

[54] METHOD AND SYSTEM FOR DETERMINING THE LOCATION FOR PERFORMING FILE-FORMAT CONVERSIONS OF ELECTRONICS MESSAGE ATTACHMENTS

[75] Inventors: Shmuel Shaffer, Palo Alto; William Joseph Beyda, Cupertino; Paul Bonomo, San Jose, all of Calif.

[73] Assignee: Siemens Information and Communication Networks, Inc., Boca Raton, Fla.

[21] Appl. No.: 09/062,294

[22] Filed: Apr. 17, 1998

[51] Int. Cl.[7] .............................. G06F 15/16; G06F 17/30
[52] U.S. Cl. .............................. 709/232; 709/246; 707/1; 707/10
[58] Field of Search .................. 709/232, 246; 707/1, 10

[56] References Cited

U.S. PATENT DOCUMENTS

| | | | |
|---|---|---|---|
| 5,530,852 | 6/1996 | Meske, Jr. et al. | 709/206 |
| 5,613,108 | 3/1997 | Morikawa | 707/200 |
| 5,630,060 | 5/1997 | Tang et al. | 709/238 |
| 5,632,018 | 5/1997 | Otorii | 709/200 |
| 5,675,507 | 10/1997 | Robo, II | 709/206 |
| 5,771,355 | 6/1998 | Kuzma | 709/232 |
| 5,826,062 | 10/1998 | Fake et al. | 709/206 |
| 5,845,282 | 12/1998 | Alley et al. | 707/10 |
| 5,903,723 | 5/1999 | Beck et al. | 709/200 |

*Primary Examiner*—Krisna Lim

[57] ABSTRACT

A method and system for exchanging electronic messages, such as email messages, include isolating personal computers and other client devices from the process of converting a message attachment from one file format to a second file format. File-format conversions are out-tasked to enhance file accessibility, free computer resources, and conserve a user's time. The access requirements of each attachment to electronic messages are compared to the capabilities of a target client device. If it is determined that a file-format conversion is required, the conversion operation is assigned to a server that supports the process of reformatting the attachments. In an email environment, the server is substantially equivalent to the conventional email server, but includes enhanced conversion capabilities. In one embodiment, the determination of whether an attachment is accessible without conversion occurs at the server level. In another embodiment, the determination is implemented at the client device level. Preferably, if a local email server is incapable of reformatting the attachment, a request is transmitted to a remote server to perform the conversion. Typically, the remote server is the email server that supports message exchanges for the person who originated the message.

20 Claims, 3 Drawing Sheets

METHOD AND SYSTEM FOR DETERMINING THE LOCATION FOR PERFORMING FILE-FORMAT CONVERSIONS OF ELECTRONICS MESSAGE ATTACHMENTS

BACKGROUND OF THE INVENTION

The invention relates generally to message delivery systems and more particularly to methods and systems for providing compatibility between file attachments of the messages and resource capabilities of devices to which the messages are directed.

DESCRIPTION OF THE RELATED ART

Systems that support the exchange of text messages among users often allow files to be attached to messages. As one example, electronic mail (i.e., email) may have an attachment that is a word processing document, or an audio, video or graphics file. As another example, a download of a message from a web site on the World Wide Web may include an attached text file in Hypertext Markup Language (HTML) or an attached audio, video or graphics file.

Messages may be transmitted from a sending client device (such as a computer) or from a remote server (such as a web server) to a message transport server that supports a computer or other client device at which the receiving party attempts to access the message. In an email environment, a sending party may generate an email message at a first computer that transmits the message to a first email server. If the first email server does not support message access for the party to whom the message is directed, the first email server forwards the message to a second email server that supports access by the receiving party. The message is stored at the second server for download by the receiving party.

Such message exchange systems operate seamlessly for messages that do not include file attachments, since the systems are designed for sending embedded text. Email is basically an ASCII text system. Difficulties arise when a message includes an attached file. Seamless access to the attached file may be inhibited by decoding-specific requirements or application-specific requirements upon the receiving client device. Regarding the decoding-specific requirements, attached files are typically encoded to accommodate transmission within a network, such as the Internet. There are different available protocols for accomplishing the encoding. One such protocol is Multimedia Internet Mail Extensions (MIME), which converts the attached files to text and sends the converted text within the message. The converted text is then reconverted to its original form at the receiving client device. Other well known standards include UUencode and BinHex. At the receiving client device, the same encoding standard must be used to decode the attached file, if the file is to be accessed.

Even if the attached file is properly decoded at the receiving client device, the file will not be accessible unless the client device has the required application program for opening the attached file. Typically, an attachment has a file format that is specific to an application. For example, an email attachment of a word processing text file may be specific to a particular word processing program. Access to the text is possible only if the receiving client device includes the program or has the capability of converting the decoded file to another file format that is accessible. Video, audio and graphics files typically have more exacting demands. For example, an AVI video formatted file is not converted to a MPEG video formatted file without significantly more complexity than the process of converting from one application-specific word processing file format to a second application-specific word processing file format.

Many client devices have the capability of converting attachments from a limited number of inaccessible file formats to an acceptable me format. If the attachment is a relatively short word processing document, this capability is all that is required for efficient display of the document at the receiving client device. However, if the attached file is large, such as an intra-corporation multimedia presentation of a new product release, the required time to convert the attachment between file formats may lead to a significant inefficient use of the time of corporate personnel. Particularly in the conversion of multimedia file attachments, a complex algorithm must be utilized.

Thus, if a file attachment is received that requires an application that is "foreign" to the receiving computing device, the first issue is whether the computing device is capable of converting the attachment to an accessible file format. A second issue relates to the time requirements of the conversion process, if a conversion is executable. A third issue relates to the reliability of the conversion operation. Often, the conversion causes data loss.

What is needed is a messaging method and system that provide an efficient and reliable exchange of attached files in a multi-application environment.

SUMMARY OF THE INVENTION

A method and system for exchanging electronic messages, such as email messages, include out-tasking conversions of file formats when it is determined that a client device does not include the resources to directly access an attachment without conversion. The access requirements of each attachment to electronic messages are compared to the capabilities of the client device to which the attachment is to be transferred. If it is determined that a file-format conversion is required, the conversion operation is assigned to a server that supports the process of reformatting the attachment. In an email environment, the server may be substantially equivalent to the conventional email server, but includes enhanced conversion capabilities.

In one embodiment, the determination of whether an attachment is accessible without conversion by a target client device occurs at the server. One means of enabling the server to execute the determination is to maintain a universal register of applications at the server. The universal register may be a lookup table that identifies each application program stored at each client device supported by the server. The lookup table may also include data that matches each user (i.e., potential recipient) with a client device at which the user typically accesses messages (e.g., a target computer). When a message is received at the server, the file format of any attachment is identified. In its simplest form, this is accomplished by looking at the file extension (e.g., .BMP identifies a bitmap graphics format and .MPEG indicates a specific video format). Alternatively, the format indicator may be embedded by the sending party within the message that includes the attachment. As a third possibility, the server may access each attachment in order to identify its file format. If a file-format conversion is necessary, the conversion can be implemented at the server, thereby freeing resources and processing time at the target client device. In this embodiment, the conversion may be transparent to the receiving party.

In another embodiment, the determination of whether an attachment is accessible without conversion occurs at the target client device. Conventionally, computers include a register of applications that are stored in memory. Such an application register may be used to automatically check attachment accessibility. If the client device is unable to access the attachment without conversion, a request may be transmitted to the server to perform the conversion. Many server protocols allow messages to be left on the server for a period of time after a download to a target client device (e.g., Post Office Protocol-POP3). Thus, it is not necessary to upload the attachment in order to allow the conversion at the server. Following the conversion to a directly accessible file format, the attachment is again downloaded to the target client device.

The out-tasking of the conversion operation to the local server may be utilized even if the target client device is capable of the file-format conversion. By executing the conversion at the server, the process is completed off-line with respect to the user and the user's client device. This frees the resources of the client device to perform other tasks and often saves time for the user.

However, if neither the client device nor the local server is capable of performing the necessary conversion to allow file access by the target client device, the invention preferably includes a step of transmitting a request to a remote server to perform the conversion. Typically, the remote server is the message server that supports the exchange of messages for the person who originated the message having the attachment that requires conversion. In another embodiment, the server is maintained by an independent entity. For occasions in which the remote server is capable of converting the attachment, the format-converted file is returned to the local server for access by the recipient user. On the other hand, if the remote server cannot perform the conversion, the conversion request may be passed to the sending client device, attempting to trigger an automatic conversion and/or notifying the sender that this attachment was not accessed by the intended receiver.

DETAILED DESCRIPTION

Figure 1:
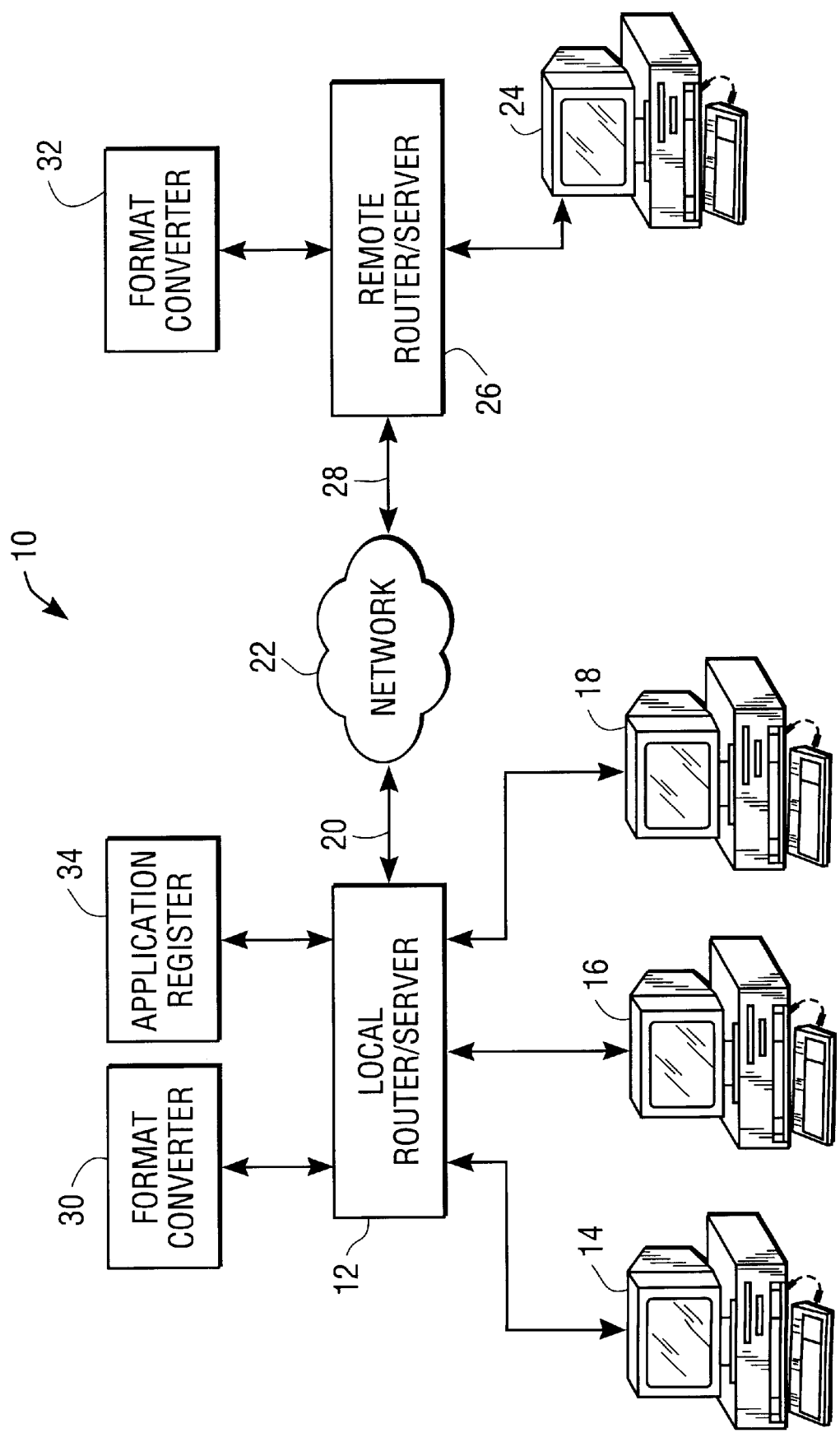
FIG. 1 is a schematic view of one embodiment of a message exchange system that provides file-format conversion in accordance with the invention.

With reference to FIG. 1, a messaging system 10 is shown as including a local router/server 12 for supporting access to stored messages by a number of client devices 14, 16 and 18. The routing operations of the router/server 12 are not the primary focus of the messaging system and method. Therefore, the router/server will be identified primarily as the local server. The structure of the server is not critical to the invention. Conventional message servers are used to store received messages and to provide access to the stored messages upon verification of a user identity. Such identification generally requires input of a password that is specific to the user.

The messaging system 10 may be used to exchange messages of any one of a variety of message types. For example, the messages may be downloads from a web site of the World Wide Web, so that a link 20 to a network 22 is a connection to the global communications network referred to as the Internet. However, the system and method will be described primarily with respect to the preferred embodiment of exchanging email messages having file attachments.

As is well known in the art, a person at a remote client device 24 may transmit an email message to a person who accesses email via the local server 12. The email message may be routed from the router/server 26 of the remote client device to the local server 12 via two communication links 20 and 28 to the network 22. The email message may be accessed by the target user using any of the supported client devices 14, 16 and 18.

In an Internet application of the system and method of exchanging email, the local and remote router/servers 12 and 26 are Internet Service Providers (ISPs). It is not critical that the sending and receiving client devices subscribe to different ISPs. That is, the method to be described below may be utilized to provide file-format conversion of an attachment to a message sent from one of the local client devices 14, 16 and 18 to another one of the local client devices.

The invention may also be used in a local area network or wide area network environment. For example, the network 22 may be a corporate network of a single company having one or more sites.

One concern in the exchange of electronic messages, such as email, is that attachments may have access requirements that are not within the immediate capabilities of a receiving client device 14, 16 and 18. For example, access to a video file that is attached to an email message may have a file format that requires a receiving client device to have a specific application program, such as an MPEG player. If the receiving device does not include the necessary program, direct access is typically not possible. Thus, there is a possibility that the target user will not be able to display the attachment. Many client devices have programs with the capability of converting attachments from a limited number of inaccessible file formats to an acceptable file format. A word processing document may be efficiently converted. However, if the attached file is large, such as an intra-corporation multimedia presentation of a new product release, the conversion process is likely to be time consuming. The process may dominate the resources of the client device, preventing a user from efficiently utilizing his or her time.

The messaging system 10 of FIG. 1 provides an improvement over the conventional system by providing a format converter 30 at the server level. Consequently, if it is determined that a file attachment to an electronic message includes an attachment that cannot be accessed without file-format conversion by the target client device 14, 16 and 18, the conversion process may be out-tasked to the format converter 30. If the determination of the capabilities of the target client device occurs at the server level, the resources of the target device remain free during the entire process. That is, by providing a format check and a capability comparison at the local server 12, the process occurs while the target client device is off-line and the process is executed in a manner that is transparent to the target device. In this server-level embodiment, an application register 34 is utilized by the local server to monitor the access capabilities of each client device, as will be explained more fully below. The client devices may be individually polled to determine which file formats are accessible without conversion. Alternatively, the client devices may be programmed to provide updates regarding their capabilities.

In another embodiment, the format check and the capability comparison occurs at the target client device 14, 16 and 18 at which the receiving party accesses the electronic message stored at the local server 12. If it is determined that the message attachment is inaccessible without conversion, a request is transmitted to the local server 12 to file-format convert the attachment at the converter 30. For example, a special protocol element P may be sent to request the conversion. Often, downloading an electronic message to a client device does not delete the storage of the message from the local server. For example, email servers based on the standard POP3 (Post Office Protocol) maintain a copy after download to a target client device. Thus, it is not necessary to upload the message to the local server 12 for conversion by the format converter 30.

If the format converter 30 of the local server 12 is unable to convert the attached file, the message can be sent to the remote router/server 26 from which the message was originally received. This may be necessary when the file format is unrecognized at the local server 12 and format converter 30. As another possibility, the format converter may not have the programming algorithm for converting an attachment having a particular file format.

In the embodiment in which the compatibility comparison occurs at the client device level (rather than the server level), the special protocol element P that was originally generated at the target client device 14, 16 and 18 may be forwarded from the local server 12 to the sending remote router/server 26 to request the necessary manipulation of the attachment that is not locally convertible. The remote router/server 26 is connected to a second format converter 32. If the second format converter is capable of placing the attachment in a file format that is accessible by the target client device, the file format can be changed and the message can be retransmitted to the local server 12 for subsequent access by the target client device. On the other hand, if the remote conversion is not successful, the router/server 26 can return the message to the original client device 24. In some applications, the original client device may be automatically triggered to attempt to locally convert the attachment. However, in typical applications, the message to the originating client device 24 is an informational message that the target client device was unable to read the attachment, so that the attachment should be resent in an accessible format.

The protocol elements and messages described above can be designed and implemented in a manner in which they are buried in text format within the electronic message. Thus, any intermediary servers are unlikely to recognize the conversion requests. If the protocol message is human readable, it can arrive at the sender's message box of the remote router/server 26 for subsequent viewing by the sender.

In the embodiment of FIG. 1, the client devices 14,16, 18 and 24 are shown as being computers. However, this is not critical. In the email application, the client devices may be any device that is used to access email, either by means of wired transmission or wireless transmission.

The attachments to the messages may be simple word processing documents. However, the invention is more beneficial if the conversion complexity and time consumption are greater than the complexity and time consumption typically associated with converting a word processing document. For example, the attachment may be audio embedded into an email message, with the audio file requiring a specific player. In other examples, the attachments may be video files or graphic files or a multimedia presentation.

Figure 2:
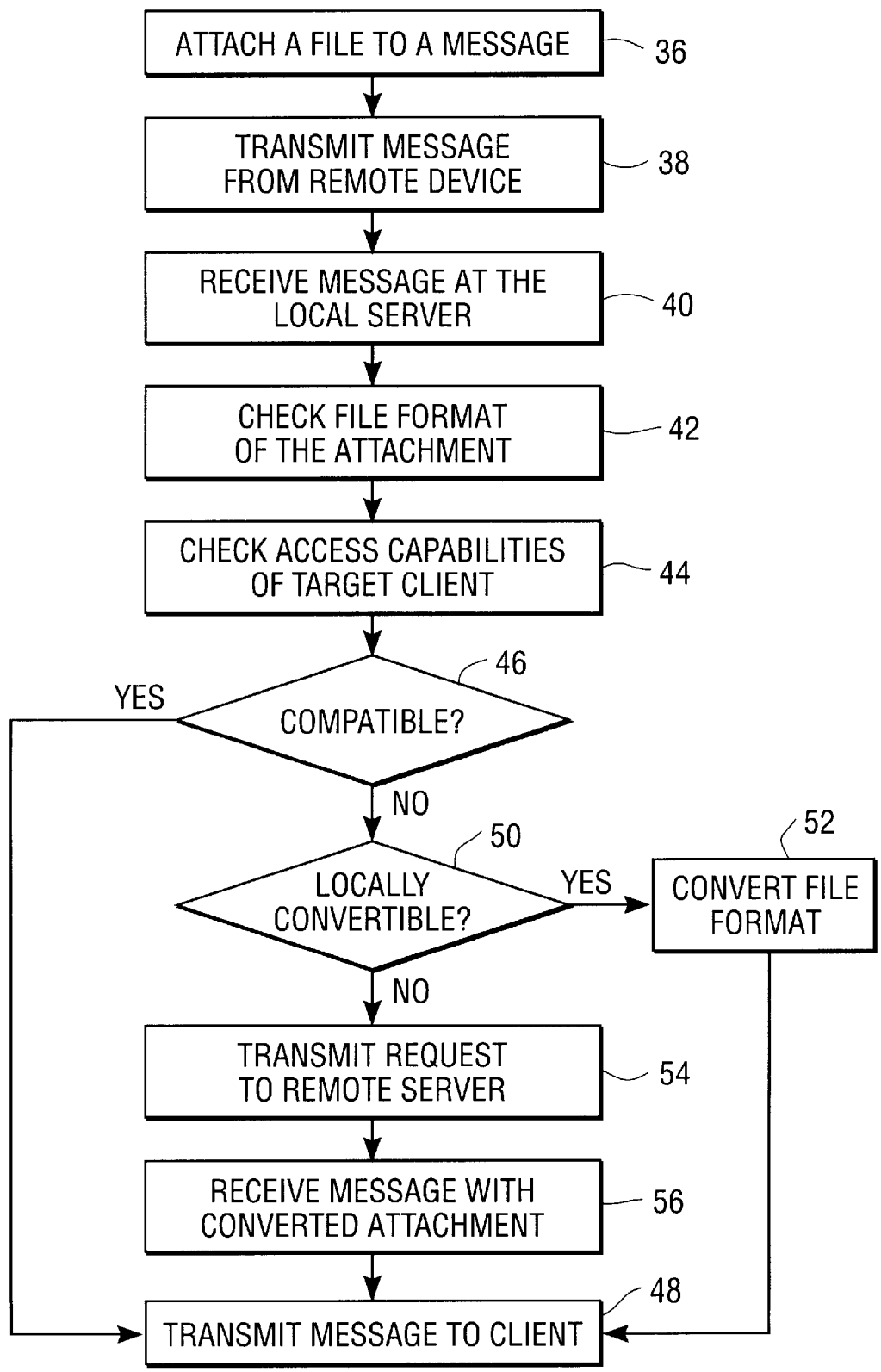
FIG. 2 is a process flow of one embodiment for carrying out the conversion process in the system of FIG. 1.

The application in which the format check of an attachment and the access-capability assessment occur at the server level will be described with reference to FIGS. 1 and 2. In a first step 36, a file is attached to an electronic message. In the preferred embodiment, the message is an email message having a file attachment. With reference to FIG. 1, step 36 may be executed at the remote client device 24.

In step 38, the electronic message is transmitted from the remote client device 24 to the local server 12. At step 40, the local server receives the message and preferably stores the message in memory, using techniques well known in the art. For example, each subscriber of an ISP is assigned an email mailbox into which messages directed to the subscriber are stored. The mailbox system is carried out in software. A similar system is implemented within a corporate environment in which email and other electronic messages are exchanged within a corporate firewall. Thus, the message and attachment may be generated at one of the local client devices 14, 16 and 18 for access at another local client device.

In step 42, the file format of the attachment is identified at the server level. In its simplest form, this may merely be a check of the file extension of the attachment. For example, .BMP identifies a bitmap graphics format and .MPEG identifies a specific video format. As another format indicator, there may be an identifier that is intentionally embedded by the sending party within the message to indicate the file format of the attachment. As a third alternative, the server may attempt to access the attachment in order to identify its file format. Other approaches to checking the file format may also be implemented.

At step 44, the access capabilities of the target client device 14, 16 and 18 are determined. Referring to FIG. 1, an application register 34 may be maintained at the server level. As is well known in the art, computers typically maintain an application register of programs stored at the computer. The application register 34 of FIG. 2 may be considered to be a universal application register that identifies all of the access capabilities of various client devices that are used to access email stored at the local server 12. In one embodiment, the application register is maintained as a lookup table. When a client device is first used to access email stored at the local server, the client device is polled to identify its access capabilities. The polling process may also be used to periodically update a lookup table that is compiled within memory of the server or within memory of an adjunct device. While the format converter 30 and the application register 34 are shown as being connected to the local server 12, the operations of the converter and register may be integrated into known servers. As an alternative to the polling approach, the client devices 14, 16 and 18 may be programmed to identify their individual access capabilities each time that a program is upgraded or added to the client device.

At step 46, it is determined whether the attachment is accessible at the target client device without conversion. If the attachment is accessible without conversion, the message is transmitted to the target client at step 48. This transmission is a conventional download step and its execution is not critical to the invention. Optionally, if it is determined that the attachment is inaccessible without conversion, the message may nevertheless be transmitted to the client, if there is a determination that the conversion is neither complex nor time consuming. For example, a short word processing document may be forwarded to the target client device despite a conversion requirement.

If at step 46 it is determined that there is an incompatibility between the access requirements of the attachment and the direct access capabilities of the target client device, the process proceeds to step 50 for a determination of whether the attachment is locally convertible. If the attachment is locally convertible, the file-format change is implemented at step 52 and the message is made accessible to the target client device at step 48. Preferably, the checking steps 42 and 44, the determining steps 46 and 50, and the conversion step 52 are implemented without intervention by the target client device. Thus, the process occurs "off-line" with respect to the target client device. This frees the client device to operate in other capacities.

The file format conversion at step 52 is executed using known techniques. Conventionally, computer software is utilized to change an attachment from one file format to another. However, if the format converter 30 of FIG. 1 is incapable of providing the conversion, because the file format is unrecognizable or because the format converter is not programmed to provide a particular conversion, the conclusion at step 52 is that the attachment is not locally convertible. In this situation, a request is generated and transmitted from the local server 12 to the sending remote router/server 26. The request includes instructions to convert the attachment to an accessible file format. For example, at step 54, a special protocol element P may be generated and transmitted to the remote server to determine whether the remote format converter 32 has capabilities beyond that of the local system. Ideally, at step 56, the attachment is reformatted remotely and the local server 12 receives the message with a converted attachment, which is made available to the target client device at step 48. However, if neither the local system nor the remote system is capable of providing an accessible attachment, the protocol message may be forwarded to the originating client device 24. As previously noted, the forwarded protocol message may be used merely to inform the sending party that the attachment was not received and displayed at a client device. Alternatively, the protocol message may be formatted to trigger an automatic conversion and retransmission of the attachment in an alternative file format.

Figure 3:
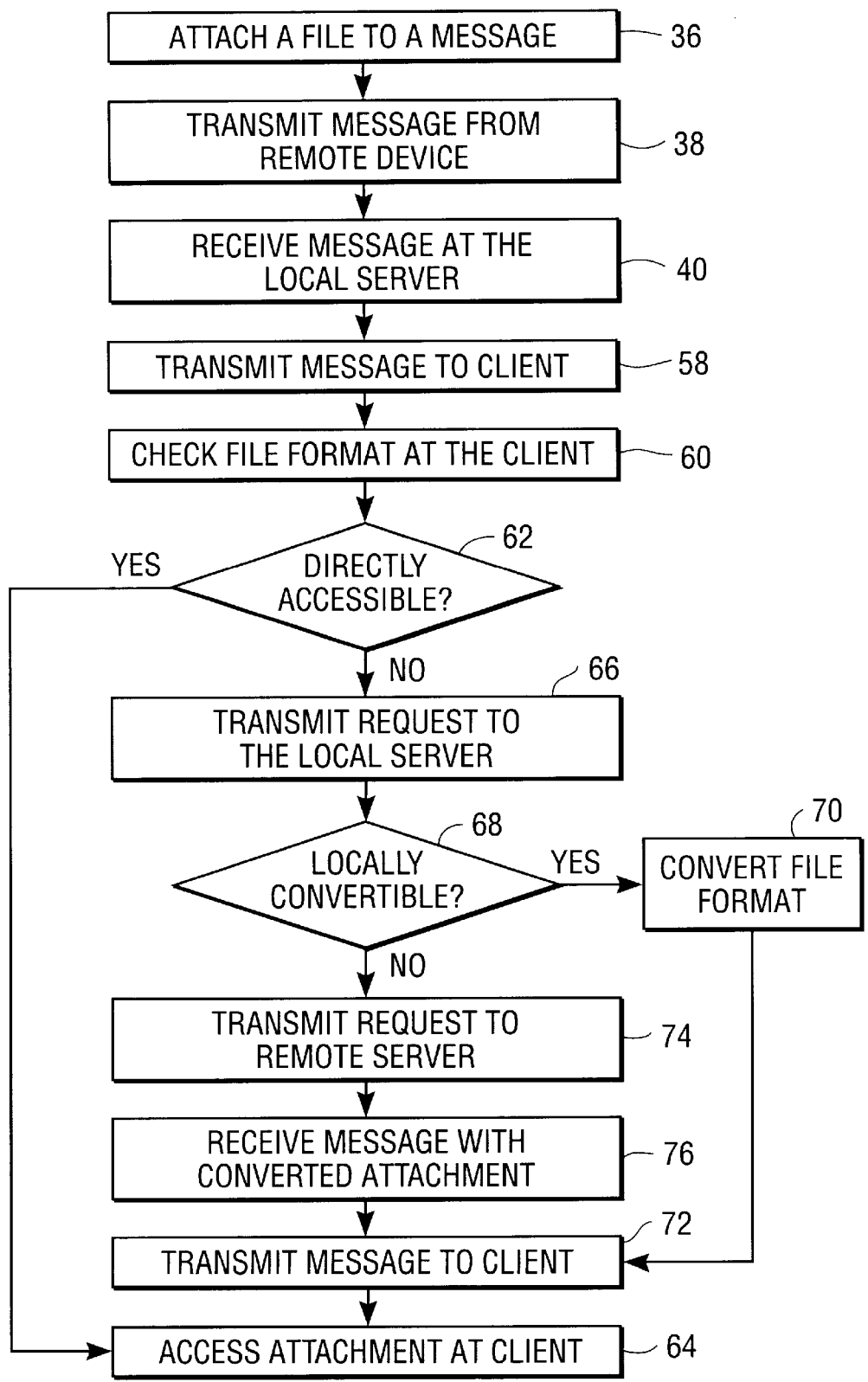
FIG. 3 is a second embodiment of a conversion process in accordance with the invention.

Reference will be made to FIGS. 1 and 3 in describing the embodiment in which the format check and the access-capability determination occur at the target client device 14, 16 and 18. Steps 36, 38 and 40 are identical to the process described with reference to FIG. 2. Thus, a file is attached to a message at a sending client device 24 and the message is received at the local server 12. The message is stored for access by the user at one of the local client devices 14, 16 and 18. When access is requested, the message is transmitted to the client device at step 58.

A file format check occurs at the target client device in step 60. Some of the possible approaches to performing the check were described with reference to step 42 in FIG. 2. For example, the format check may merely be an identification of the file extension.

After the file format has been identified, in step 62 it is determined whether the attachment is directly accessible, i.e., whether the attachment is accessible without conversion. If the attachment is directly accessible, the file is displayed at step 64. On the other hand, a determination that the attachment is inaccessible without conversion triggers a transmission of a request to the local server 12 at step 66. The request may be the above-identified protocol element P. The request includes instructions to convert the attachment to a particular accessible file format.

In the determination step 68, the ability of performing the requested manipulation at the format converter 30 is ascertained. If the ability exists, the process is implemented at step 70. Preferably, the message and attachment remain stored at the local server, so that the conversion can take place without an upload of the message from the target client device to the local server. Following the file-format change at step 70, the message is again accessible to the client device at step 72, but with the attachment in a directly accessible file format.

Returning to the determination step 68, a negative response to the capability of executing a local conversion will trigger a transmission of a request to the remote router/server 26 from which the message was received. This is shown at step 74. If the remote format converter 32 is capable of performing the requested reformatting operation, the reformatted attachment is transmitted to the local server 12 at step 76. The reformatted attachment may then be transmitted to the target client device at step 72 for display at step 64. On the other hand, if the reformatting operation cannot be executed, the request is forwarded to the originating client device 24. As previously noted, this request may merely be informational or may be used to automatically trigger a desired operation at the remote client device, such as a reformatting operation. The protocol message can be designed in a way that the protocol element P is buried in text format in an email message that is human readable, so that intermediary servers do not recognize the conversion request as the request is forwarded to the sender's server.

While the invention has been described primarily with respect to email transmissions, this is not critical. The system and method may be used in other applications. Moreover, it is anticipated that servers will be dedicated to the attachment conversion. Web sites may also performs these functions, so that unresolved requests for conversion may be sent to a conversion service that is outside of the sender-to-receiver transmission path. That is, the format converter 30 may be maintained by a private company that provides service to subscribing companies or individuals.

What is claimed is:

1. A method of providing message exchange capability for a plurality of users comprising steps of:

receiving electronic messages at a server that supports message access by said users, including receiving first electronic messages having attachments in file formats that are each specific to one of a plurality of applications;

identifying capabilities of client devices with respect to accessing said attachments without conversion from an original file format to a second file format;

determining whether said attachments are accessible without conversion by specific client devices to which said attachments are transferred;

converting first attachments from original file formats to selected second file formats at said server in response to determinations that said first attachments of said first electronic messages are inaccessible without conversion by said specific client devices to which said first attachments are transferred, including selecting said second file formats based upon said capabilities of said specific client devices; and selectively transferring said electronic messages to said client devices, including transferring said first attachments to said specific client devices in said selected second file formats.

2. The method of claim 1 wherein said step of identifying said capabilities of said client devices includes maintaining a register of applications at said server, said register having data indicative of application programs that are stored at individual client devices.

3. The method of claim 1 wherein said step of determining whether said attachments are accessible without conversion includes comparing application requirements of each said attachment to said capabilities of said specific client devices to which said attachments are transferred, said step of comparing being implemented at said server such that said step of converting is executed prior to said first attachments being transferred.

4. The method of claim 1 wherein said step of identifying said capabilities of said client devices includes maintaining a register of applications at each client device, each register having data indicative of application programs stored at said client device at which said register is maintained, said step of determining whether said attachments are accessible without conversion being executed at said client devices.

5. The method of claim 4 further comprising a step of transmitting a client-to-server message from a first client device to said server in response to determining that an attachment of one of said first electronic messages is inaccessible by said first client device without conversion, said message being a request to convert said attachment at said server.

6. The method of claim 1 further comprising a step of determining whether said server has a capability of converting said attachments to file formats that is are accessible by said specific client devices to which said attachments are transferred, said method further comprising a step of generating and transmitting a request to a remote server from which a particular electronic message was received as a response to determining that said particular electronic message includes an attachment which said server is incapable of converting to a file format that is accessible by a client device to which said particular electronic message is to be transferred, said request including instructions to convert said attachment at said remote server to an accessible file format, said electronic messages being email messages.

7. The method of claim 6 further comprising transmitting a second request from said remote server to a remote client device at which said particular electronic message was generated in response to determining that said remote server is incapable of converting said particular electronic message to said accessible file format, said second request including instructions to retransmit said attachment in an accessible file format.

8. The method of claim 1 wherein said step of determining whether said attachments are accessible without conversion includes accessing text information of said first electronic messages, said text information being indicative of said original file formats of said first electronic messages.

9. The method of claim 1 wherein said step of receiving said first electronic messages includes receiving said attachments in video and graphics file formats, said first electronic messages being email messages, said step of converting said first attachments including converting video files and graphics files from original viewing file formats to alternative viewing file formats.

10. The method of claim 9 wherein said step of receiving said first electronic messages includes receiving said attachments in audio file formats, said first electronic messages being email messages, said step of converting said first attachments including converting audio files from original playing file formats to at least one alternative playing file format.

11. A method of accessing email attachments comprising steps of:

receiving an email message at a local server, said email message having an attachment having an original application-specific file format, said email message further having a text portion in a file format different than said attachment;

comparing access requirements of said attachment in said application-specific file format to format capabilities of a client device to which said email message is directed for access by a user, said format capabilities being indicative of an ability to access said attachment in said original application-specific file format;

converting said attachment to a second application-specific file format in response to determining that said attachment is inaccessible at said client device while in said original application-specific file format, said converting being implemented at a site remote from said client device;

leaving said attachment in said original application-specific file format in response to determining that said attachment is accessible at said client device while in said original application-specific file format; and transferring said attachment from said local server to said client device.

12. The method of claim 11 wherein said step of comparing said access requirements to said format capabilities is executed at said local server and includes maintaining a register of applications at said local server, said register having data indicative of said format capabilities of said client device.

13. The method of claim 11 wherein said step of comparing said access requirements to said format capabilities is executed at said client device, said method further comprising transmitting a message to said local server to request said conversion of said attachment by said local server when it is determined that said attachment is inaccessible by said client device without said conversion.

14. The method of claim 13 further comprising transmitting a second message to a remote server to request said conversion of said attachment by said remote server when it is determined that said local server is incapable of said conversion.

15. The method of claim 11 wherein said step of receiving said attachment is a step of receiving a video or graphics file.

16. The method of claim 11 wherein said step of comparing said access requirements to said file capabilities and said step of converting said attachment are implemented such that said client device is free to execute other tasks during said converting.

17. An email delivery system comprising:

a local email server connected to a network to receive email messages, including first email messages having attachments in original file formats that are each specific to one of a plurality of applications, said local email server having memory for storing said email messages;

a plurality of client devices connected to said local email server to selectively access said email messages;

register means for identifying first attachments that are inaccessible by a specific one of said client devices in an absence of converting said first attachments from said original file format, said first attachments being discrete file attachments of said first email messages, said register means being connected to one of said local email server and said plurality of client devices; and converter means responsive to said register means and located at said local email server for converting each said first attachment to a second file format that is selected to accommodate access without conversion by said specific one of said client devices.

18. The system of claim 17 wherein said register means is a register stored at said local email server, said register having data indicative of a plurality of applications that are stored at each one of said client devices.

19. The system of claim 18 wherein said converter means is a conversion program stored in said memory of said local email server.

20. The system of claim 19 further comprising means for transmitting a request to a remote server to convert a particular one of said first attachments in response to a determination that said local email server lacks resources for converting said particular first attachment to said selected second file format.

* * * * *